(12) United States Patent
Kisor et al.

(10) Patent No.: US 8,626,363 B2
(45) Date of Patent: Jan. 7, 2014

(54) AIRCRAFT FEATHERING, FLAPPING AND ROTOR LOADS INDICATOR

(75) Inventors: Ron Kisor, Coppell, TX (US); Wendell Bielefeld, Arlington, TX (US); David Hughling, Fort Worth, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 668 days.

(21) Appl. No.: 12/525,903

(22) PCT Filed: Feb. 8, 2008

(86) PCT No.: PCT/US2008/053402
§ 371 (c)(1),
(2), (4) Date: Jan. 10, 2011

(87) PCT Pub. No.: WO2008/118547
PCT Pub. Date: Oct. 2, 2008

(65) Prior Publication Data
US 2011/0112806 A1    May 12, 2011

Related U.S. Application Data

(60) Provisional application No. 60/900,091, filed on Feb. 8, 2007.

(51) Int. Cl.
*G08B 23/00*    (2006.01)

(52) U.S. Cl.
USPC .............. 701/14; 701/3; 701/4; 701/8; 701/9; 340/945; 340/963; 340/971

(58) Field of Classification Search
None
See application file for complete search history.

(56) References Cited

U.S. PATENT DOCUMENTS

| | | | |
|---|---|---|---|
| 4,406,169 A | 9/1983 | Ikeuchi et al. | |
| 4,870,412 A | 9/1989 | Vuichard | |
| 5,051,918 A * | 9/1991 | Parsons | 73/112.06 |
| 5,986,582 A * | 11/1999 | Greene et al. | 340/965 |
| 6,823,853 B2 | 11/2004 | Clarkson et al. | |
| 7,098,811 B2 * | 8/2006 | Augustin et al. | 340/965 |
| 7,126,496 B2 * | 10/2006 | Greene | 340/946 |
| 7,262,712 B2 * | 8/2007 | Greene | 340/965 |
| 2013/0105637 A1 * | 5/2013 | Stamps et al. | 244/76 R |
| 2013/0120165 A1 * | 5/2013 | Mccollough et al. | 340/946 |

OTHER PUBLICATIONS

International Search Report and Written Opinion for PCT/US2008/053402, mailed on Sep. 25, 2008.

(Continued)

*Primary Examiner* — Jonathan M Dager
(74) *Attorney, Agent, or Firm* — Pillsbury Winthrop Shaw Pittman LLP

(57) ABSTRACT

A feathering, flapping and rotor loads indicator for use in a rotorcraft includes a calculation unit configured to calculate (a) a current temperature of a bearing of the rotor assembly using a first calculation model, (b) a projected temperature of the bearing using the first calculation model and (c) a load exerted on a selected component of the rotor assembly using a second calculation model, the first and second calculation models adapted to calculate, respectively, the projected and the current temperatures of the bearing and the load exerted on the selected component based on flight control parameters; and a display unit configured to display on a common scale a movable indicator, the movable indicator being driven by the highest value between the projected temperature of the bearing and the load exerted on the selected component. The display unit displays another movable indicator driven by the current temperature of the bearing.

51 Claims, 11 Drawing Sheets

(56) References Cited

OTHER PUBLICATIONS

Montague et al., Experimental High Temperature Characterization of a Magnetic Bearing for Turbomachinery, Mar. 2003, Retrieved from the Internet: <URL: http://gltrs.grc.nasa.gov/reports/2003/TM-2003-212183.pdf>.

International Preliminary Report on Patentability for PCT International Patent Application No. PCT/US2008/053402, mailed on Aug. 11, 2009.

* cited by examiner

AIRCRAFT FEATHERING, FLAPPING AND ROTOR LOADS INDICATOR

CROSS REFERENCE TO RELATED APPLICATIONS

This is the U.S. National Phase of PCT/US2008/053402, filed Feb. 8, 2008, which in turn claims priority to U.S. provisional application no. 60/900,091, filed Feb. 8, 2007, the contents of both of which are incorporated herein in their entirety by reference.

BACKGROUND

1. Field

The present invention relates to a feathering, flapping and rotor loads indicator for use in an aircraft rotor system.

2. Description of Related Art

Flight envelope limitations have been conventionally used to delineate the safe range of operation of an aircraft. Flight envelope limitations may be defined as the parameters within which an aircraft can be safely operated, with average pilot ability, at varying density altitudes, airframe states, wing or blade loadings and atmospheric turbulence. These limitations are determined based on flight test or laboratory data, which are used to calculate the stress, temperature or other measures of health of critical components during various flight conditions.

However, flight envelope limitations are typically very conservative. As a result, they generally reduce the overall operational capability of the aircraft. In addition, they are often difficult or impossible to consider during high workload operations such as combat maneuvering or terrain following.

To address this concern and to expand the allowable flight envelope of an aircraft, it has been proposed to use strain gages to provide pilots with information pertaining to the current condition of critical elements of the aircraft. For example, in rotorcrafts, it has been proposed to use strain gages to measure most-critical component loads. However, it is not common for a single component to be critical in all flight regimes. Additionally, strain gages are generally unreliable and their use increases the recurring cost of an aircraft because they require maintenance and dedicated instrumentation. Furthermore, strain gages are unable to provide information about the temperature of critical elastomeric bearings that are used, for example, in rotorcrafts.

SUMMARY

In an embodiment, there is provided a feathering, flapping and rotor loads indicator for use in a rotorcraft, the rotorcraft including at least one engine to power a rotor assembly including a nacelle, a mast and a plurality of blades attached thereto. The feathering, flapping and rotor loads indicator includes a calculation unit configured to calculate (a) a temperature of a bearing of the rotor assembly using a first calculation model and (b) a load exerted on a selected component of the rotor assembly using a second calculation model, the first and second calculation models adapted to calculate, respectively, the temperature of the bearing and the load exerted on the selected component based on flight control parameters; and a display unit configured to dynamically display on a common scale a movable indicator, the movable indicator being driven by the highest value between the temperature of the bearing and the load exerted on the selected component.

In another embodiment of the invention, there is provided a method of providing critical component status information in a rotorcraft, the rotorcraft including at least one engine to power a rotor assembly including a nacelle, a mast and a plurality of blades attached thereto. The feathering, flapping and rotor loads indicator includes calculating (a) a temperature of a bearing of the rotor assembly using a first calculation model and (b) a load exerted on a selected component of the rotor assembly using a second calculation model, the first and second calculation models adapted to calculate, respectively, the temperature of the bearing and the load exerted on the selected component based on flight control parameters; and dynamically displaying on a common scale a movable indicator, the movable indicator being driven by the highest value between the temperature of the bearing and the load exerted on the selected component.

In yet another embodiment of the invention, there is provided a machine readable medium encoded with machine executable instructions for providing critical component status information in a rotorcraft, including at least one engine to power a rotor assembly including a nacelle, a mast and a plurality of blades attached thereto, in accordance with a method including calculating (a) a temperature of a bearing of the rotor assembly using a first calculation model and (b) a load exerted on a selected component of the rotor assembly using a second calculation model, the first and second calculation models adapted to calculate, respectively, the temperature of the bearing and the load exerted on the selected component based on flight control parameters; and dynamically displaying on a common scale a movable indicator, the first movable indicator being driven by the highest value between the temperature of the bearing and the load exerted on the selected component.

In an embodiment of the invention, there is provided a feathering, flapping and rotor loads indicator for use in a rotorcraft, the rotorcraft including at least one engine to power a rotor assembly including a nacelle, a mast and a plurality of blades attached thereto. The feathering, flapping and rotor loads indicator includes a calculation unit configured to calculate (a) a current temperature of a bearing of the rotor assembly using a first calculation model, (b) a projected temperature of the bearing using the first calculation model and (c) a load exerted on a selected component of the rotor assembly using a second calculation model, the first and second calculation models adapted to calculate, respectively, the projected and the current temperature of the bearing and the load exerted on the selected component based on flight control parameters; and a display unit configured to dynamically display on a common scale a movable indicator, the movable indicator being driven by the highest value between the projected temperature of the bearing and the load exerted on the selected component.

In an embodiment, there is provided a method of providing component status information in a rotorcraft, the method including calculating a temperature of a bearing using a first calculation model; and calculating a load exerted on a selected component of the rotorcraft using a second calculation model, the first and second calculation models adapted to calculate, respectively, the temperature of the bearing and the load exerted on the selected component based on flight control parameters.

In an embodiment, there is provided an indicator configured to provide component status information in a rotorcraft, the indicator including a calculator configured to calculate (1) a temperature of a bearing using a first calculation model and (2) a load exerted on a selected component of the rotorcraft using a second calculation model, the first and second calculation models adapted to calculate, respectively, the temperature of the bearing and the load exerted on the selected component based on flight control parameters.

DETAILED DESCRIPTION

In accordance with an embodiment of the invention, the feathering, flapping and rotor loads (FFR) indicator is adapted to provide the pilot of the rotorcraft with current and projected temperatures of critical elastomeric bearings in the rotor and a direct feedback regarding the oscillatory loads severity of the current flight condition. The information provided by the feathering, flapping and rotor loads indicator are designed to assist the pilot of the rotorcraft in avoiding flight conditions where either oscillatory loads are exceeding critical limits on critical parts or temperatures of selected bearings are exceeding a critical limit. In an embodiment of the invention, the feathering, flapping and rotor loads indicator is configured to maximize the allowable flight envelope and to provide additional flight safety by displaying to the pilot updated information pertaining to the health of the elastomeric bearings and the severity of the present maneuver, directing the pilot to take corrective action if necessary. Because the actual flight conditions are always being considered, fewer conservative assumptions are made, allowing for additional envelope beyond what conventional flight restriction charts can provide. In one implementation, the feathering, flapping and rotor loads indicator is adapted to supplement current advisory and caution messages that already exist in rotorcrafts.

Figure 2:
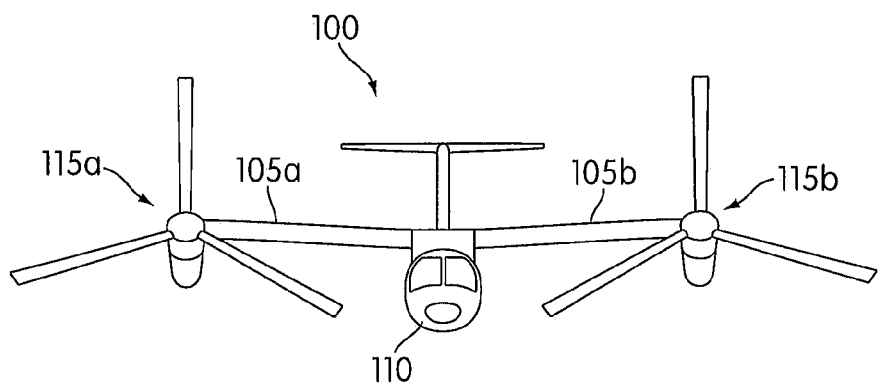
Figure 3:
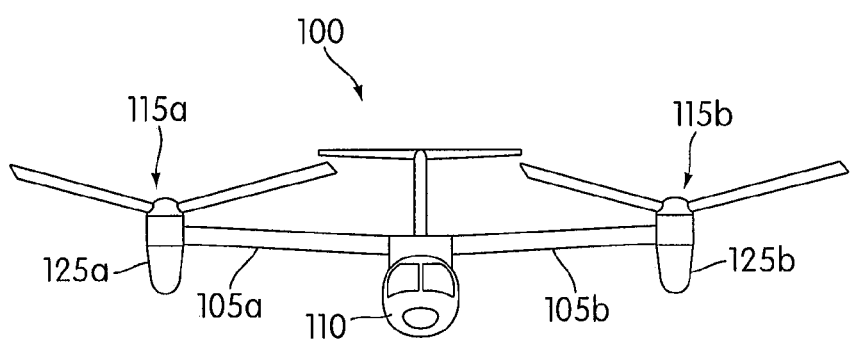

The feathering, flapping and rotor loads indicator may be implemented in conventional helicopters or tiltrotor aircrafts. A tiltrotor aircraft has three modes of operation: airplane mode, helicopter mode and transition mode. These three modes of operation are schematically represented in FIGS. 1-3.

Figure 1:
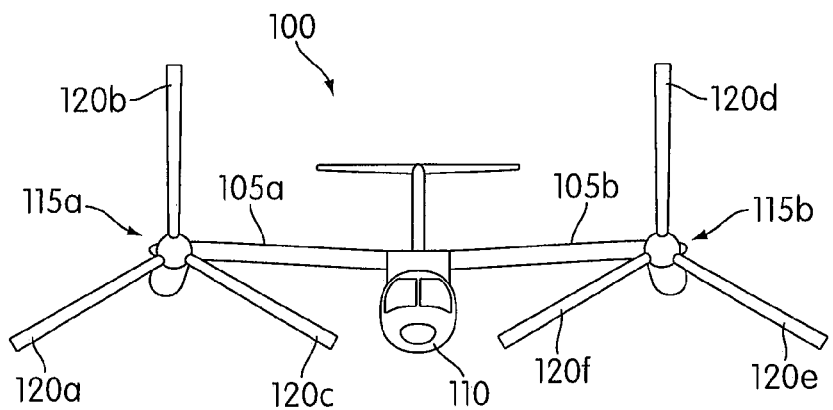
FIGS. 1-3 show a tiltrotor aircraft in accordance with an embodiment of the invention.

FIG. 1 depicts a tiltrotor aircraft 100 in an airplane mode of flight operation. Wings 105a-b of tiltrotor aircraft 100 are being utilized to lift the fuselage 110 in response to the action of rotor assemblies 115a-b. As can be seen in FIG. 1, rotor assemblies 115a-b are composed of a plurality of rotor blades 120a-f which are rotated in a rotor disk that is substantially transverse to the fuselage 110. In this mode, the rotor assemblies 115a-b provide thrust for the airplane mode of flight. In contrast, FIG. 3 depicts the tiltrotor aircraft 100 in a helicopter mode of flight with rotor assemblies 115a-b positioned substantially parallel to the fuselage 110. In this view, the pylons or nacelles 125a-b of the rotor assemblies 115a-b are depicted. Pylons 125a-b rotate in position to allow switching between the aircraft mode of flight and the helicopter mode of flight. FIG. 2 depicts the aircraft 100 in a transition mode with rotor assemblies 115a-b being shifted in position between that of an aircraft mode of flight and a helicopter mode of flight. In the transition mode of flight, the nacelles or pylons 125a-b define an angle between 0 and 95 degrees relative to the longitudinal direction of the fuselage 110. At an angle substantially equal to zero, the tiltrotor aircraft 100 operates in an aircraft mode. The nacelles or pylons 125a-b are positioned along a direction that is substantially parallel to the fuselage 110. At an angle substantially equal to 90 degrees, the tiltrotor aircraft 100 operates in a helicopter mode. The nacelles or pylons 125a-b are positioned along a direction that is substantially perpendicular to the fuselage 110. One significant benefit of this type of aircraft is the ability to take off and land like a helicopter, but with the ability to travel at relatively high speeds like an airplane. The feathering, flapping and rotor loads indicator in an embodiment of the invention is integrated into a tiltrotor aircraft such as that shown in FIGS. 1-3.

Figure 4:
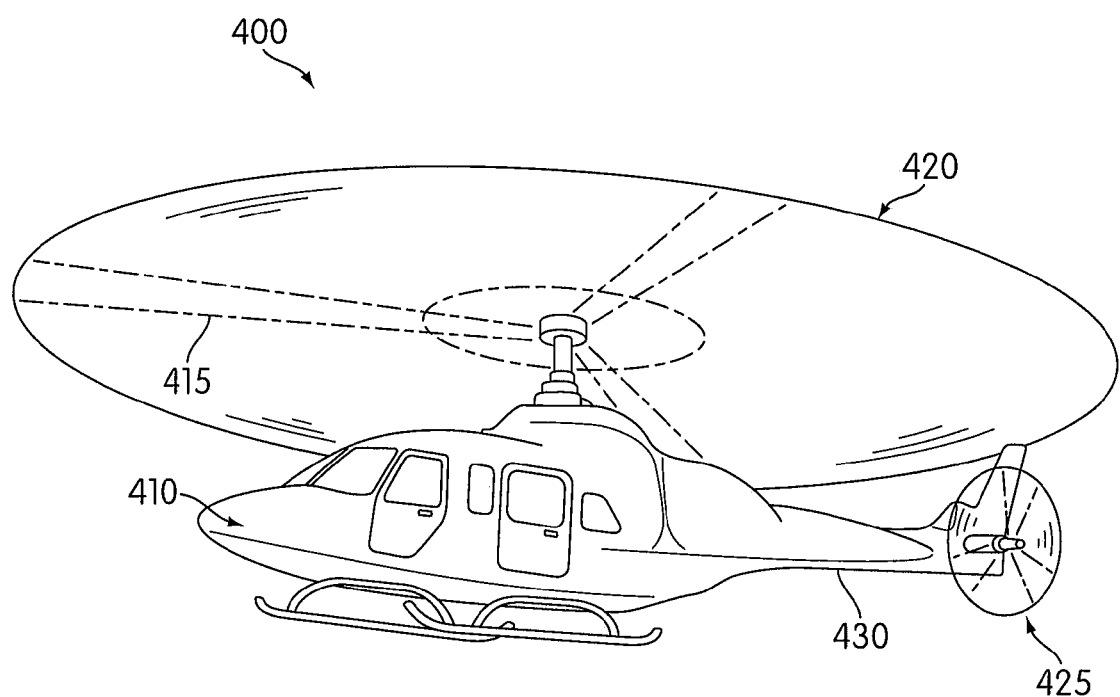
FIG. 4 shows a helicopter in accordance with an embodiment of the invention.

By way of comparison, FIG. 4 shows a helicopter 400 in accordance with an embodiment of the invention. Helicopter 400 includes a fuselage 410 and a main rotor assembly 415. Rotor assembly 415 defines a rotor disk 420 which is substantially parallel to the fuselage 410. Torque imparted by the main rotor assembly 415 to fuselage 410 is counteracted by a tail rotor 425 carried by a tail portion 430 of fuselage 410.

Control of the rotor assemblies 115a-b and/or main rotor assembly 415 is performed using mechanical and electrical systems that are designed to respond to the pilot's inputs. Mechanical systems typically include a swashplate arrangement which consists of a stationary portion and a rotating portion.

Figure 5:
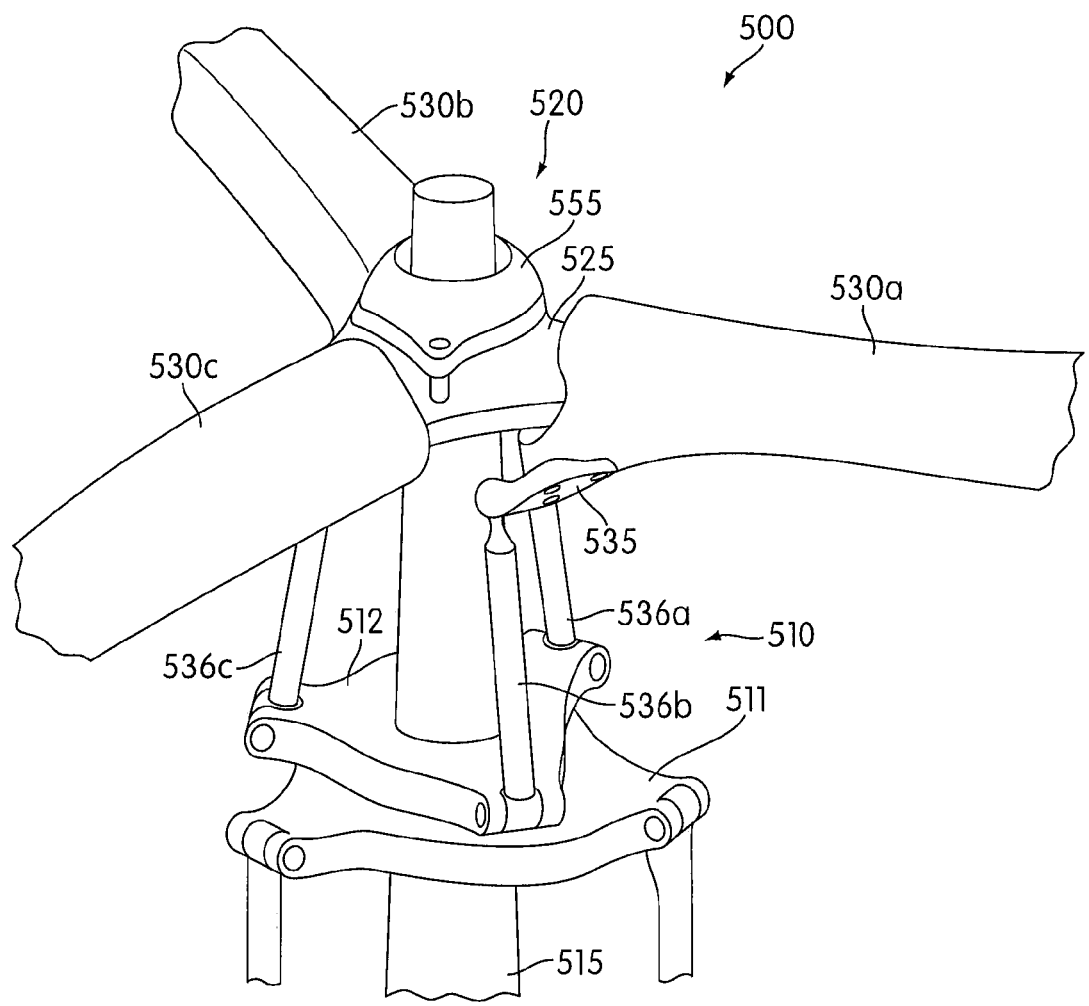
FIG. 5 shows a rotor assembly of a rotorcraft in accordance with an embodiment of the invention.

Referring now to FIG. 5, this figure schematically shows a rotor assembly 500 of a tiltrotor aircraft in accordance with an embodiment of the invention. Rotor assembly 500 includes a swashplate control system 510 that includes a nonrotating portion 511 and a rotating portion 512. A mast 515 extends through the rotating and nonrotating members 511, 512 and is coupled to a plurality of blades (not shown in FIG. 5). A hub 520 is provided which couples the rotor blades to mast 515 in a manner which transfers torque and thrust while allowing tilting of the rotor thrust vector. For example, in a mechanical system, the hub 520 may include a gimbaled yoke 525, but in electromechanical systems it may include other types of couplings. Yoke 525 is coupled to several intermediary members 530a-c attached to the blades. Each intermediary member 530a-c is connected through a pitch horn, such as pitch horn 535, and a linkage such as pitch link 536a-c, back to the nonrotating member 511 and to the pilot control systems.

The control system depicted in simplified form in FIG. 5 allows for the combination of collective control and cyclic control. Both collective control and cyclic control are accomplished through the swashplate arrangement, and the engineering details of the swashplate vary between helicopter designs. As discussed above, the upper portion of the assembly (the rotating portion) 512 is free to rotate relative to the lower, stationary (non-rotating portion) 511. Pilot inputs are provided to alter the vertical position of the stationary plate 511 through the collective control and the tilt of the plate through the cyclic control. Since the rotating plate 512 always follows the orientation of the stationary plate 511, any pilot input to the stationary plate 511 is passed onto the rotating plate 512 above it. The pitch links 536a-c and pitch horns 535 are utilized to allow the rotating plate 512 to alter the blade angle of each blade. Pulling the vertical axis control lever up moves the swashplate 510 vertically upward so that all blades contain the same increase in blade angle, referred to hereinafter as the feathering angle. Similarly, pushing the vertical axis control lever down decreases the blade angle of all blades. Variations in blade angle or feathering angle change the amount of total rotor thrust produced. Accordingly, changes in vertical axis control cause changes in total rotor thrust but they do not alter total rotor thrust orientation.

Rotor assembly 500 also includes various bearings that are designed to provide a mechanical interconnection between various elements of the rotor assembly 500. FIG. 5 shows the hub spring bearing 555 that is provided on the hub 520. The hub spring bearing 555 is sensitive to the flapping angle of the blades. Flapping angle is defined by the angle between the rotor hub and the rotor mast. The hub spring bearing 555 is sensitive to heat build-up caused by 1 per revolution oscillatory deflection induced by flapping. Flapping angle may be monitored by transducers arranged in the blades. Rotor assembly 500 also includes additional bearings such as, for example, a centrifugal force bearing or CF bearing, a spindle bearing and a pitch change bearing. For example, the CF bearing is adapted to allow the blades to pivot. The CF bearing is arranged in each intermediary member 530a-c (not shown in FIG. 5). The CF bearing is positioned between the yoke 525 and the blades and is generally sensitive to 1 per rotor revolution feathering. One per rotor revolution feathering is defined as:

$$[(a1+B1+\sin \delta 3 * b1)^2 + (b1 - A1 + \sin \delta 3 * a1)^2)]^{1/2}$$

Where
a1=longitudinal flapping
B1=longitudinal swashplate angle
b1=lateral flapping
A1=lateral swashplate angle
δ3=pitch/flap coupling, which represents the kinematic feedback of the flapping displacement to the blade pitch motion.

These various bearings, e.g. hub spring bearing 555 and CF bearing are subject to a considerable amount of oscillatory motion during operation of the rotorcraft and, as a result, tend to heat up. These bearing are made of elastomerics, which may degrade rapidly when subjected to high temperature. For safety reasons, it is therefore desirable to provide an estimate of the temperature of these bearings during operation of the rotorcraft.

Figure 6:
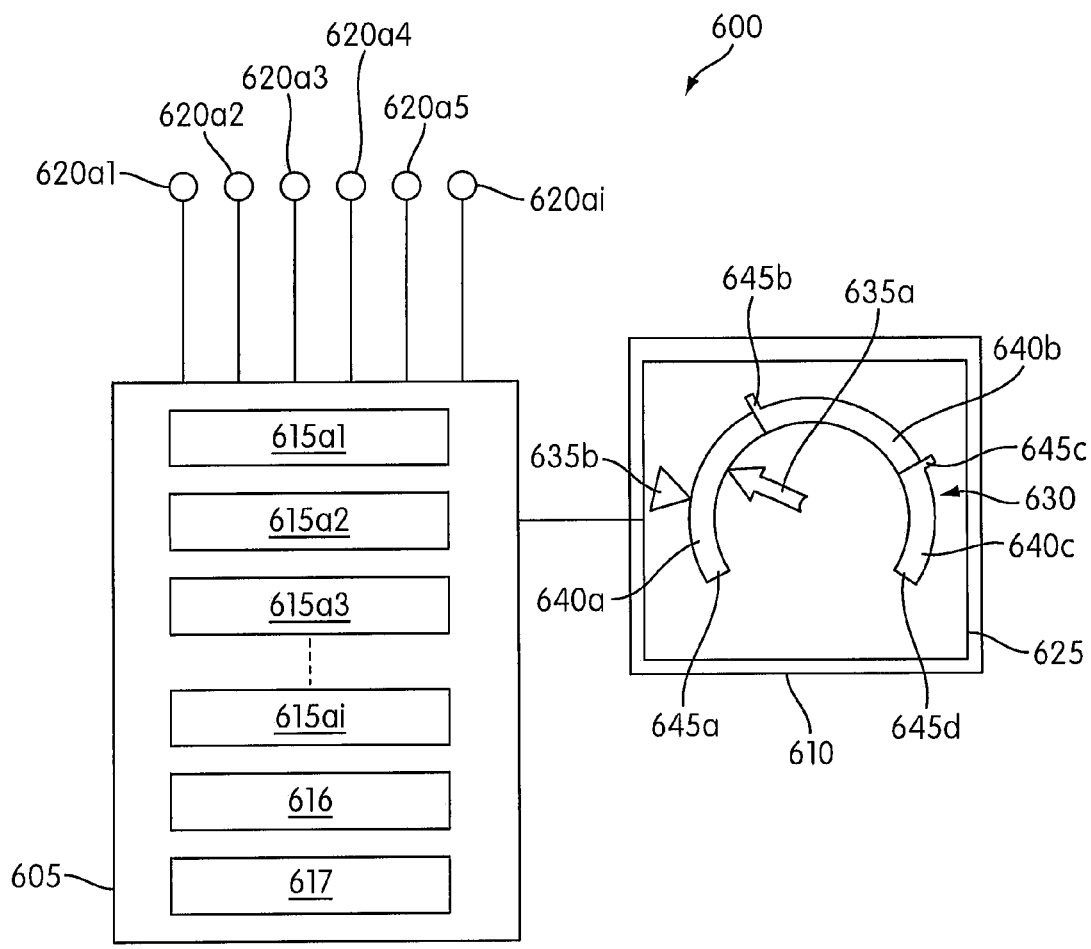
FIG. 6 shows a feathering, flapping and rotor loads indicator in accordance with an embodiment of the invention.

FIG. 6 shows the feathering, flapping and rotor loads indicator 600 in accordance with an embodiment of the invention. The feathering, flapping and rotor loads indicator 600 is constructed and arranged to calculate or provide an estimated temperature of selected bearings and estimated oscillatory loads exerted on selected components of the rotor assemblies 115a-b and 415. As shown in FIG. 6, the feathering, flapping and rotor loads indicator 600 includes a calculation unit 605 and a display unit 610. The calculation unit 605 is inputted with a plurality of flight control parameters 620a1-ai (with 1<i<n=integer) including, for example, outside air temperature, flapping angle, feathering angle and/or nacelle position. Flight control parameters 620a1-ai correspond to various parameters that are monitored and accessible to the flight control computers during operation of the rotorcraft. It will be appreciated that additional flight control parameters other than outside air temperature, flapping angle, feathering angle and or nacelle position may be inputted to and processed by the calculation unit 605 in another embodiment of the invention.

The calculation unit 605 includes a plurality of calculation models 615a1-ai (with 1<i<n=integer), 616 and 617 that are each adapted to calculate or provide an estimated temperature of a selected bearing, or an estimated oscillatory load exerted on a selected component, of the rotor assemblies 115a-b or 415. In the embodiment of FIG. 6, calculation models 615a1-ai are each configured to calculate the oscillatory load exerted on a selected component of the rotor assemblies 115a-b or 415. Calculation models 616 and 617 are configured to calculate or provide an estimated temperature of, respectively, the hub spring bearing 555 and the CF bearing as shown in FIG. 5. Each of the calculation models 615a1-ai, 616 and 617 is adapted to calculate the temperature or the oscillatory load based on the inputted flight control parameters 620a1-ai. For example, in one implementation, oscillatory loads are calculated based on feathering angle and nacelle position, temperature of the hub spring bearing 555 is calculated based on flapping angle and outside air temperature, and temperature of the CF bearing is calculated based on feathering angle and outside air temperature.

In the embodiment of FIG. 6, the calculation unit 605 includes a single calculator to perform all the calculations. In this configuration, the calculation unit 605 includes a plurality of simulation models that are used to calculate or provide estimated bearing temperatures and oscillatory loads exerted on selected components. However, it will be appreciated that the calculation unit may include separate calculators to calculate or provide estimated bearing temperatures and oscillatory loads exerted on selected components. In this latter configuration, each of the separate calculators includes a dedicated calculation/simulation model.

The display unit 610 includes a screen 625 and is configured to display the data processed by the calculation unit 605 in a specific manner. The display unit 610 includes a single gauge/indicator 630 in round-dial format and a first indicating needle or inner pointer 635a that provides the most critical information as to the projected temperature of the most critical bearing if the current flight condition is maintained or oscillatory load severity at a glance. The display unit 610 also includes a second or additional movable indicator or outer pointer 635b that shows the greatest value of any current bearing temperature. The gauge/indicator 630 may also be referred to hereinafter as a common scale. As explained in more detail below, the position of the indicating needle 635a is driven by the parameter with the highest value on the common scale. The position of the indicating needle 635b is driven by the bearing temperature with the highest value on the common scale.

The gauge/indicator 630 includes a plurality of segments 640a-c that each define an operating zone for the calculated temperature or the loads exerted on the selected components. In the embodiment of FIG. 6, segment 640a extends from radial tick mark 645a to radial tick mark 645b and is represented by a first color (e.g., green). Segment 640a corresponds to the safe operating zone of feathering, flapping and rotor loads indicator 600. When the indicating needle 635a is within the first segment 640a, the bearing temperatures and/or oscillatory loads are all within their safe recommended range of operation and the aircraft can operate indefinitely without any safety concern. Segment 640b extends from radial tick mark 645b to radial tick mark 645c and may be represented by a second color (e.g., yellow). Segment 640b corresponds to the advisory zone of feathering, flapping and rotor loads indicator 600. In this range, the bearing temperatures and/or oscillatory loads are elevated but still remain within a safe range of operation. Segment 640c extends from radial tick mark 645c to radial tick mark 645d and may be represented by a third color (e.g., red). Segment 640c corresponds to the caution zone of feathering, flapping and rotor loads indicator 600. When the indicating needle 635 is within the third segment 640c, the bearing temperatures and/or oscillatory loads are within an undesirable range of operation of the aircraft in which, potentially, excessive damage could occur. When the indicating needle 635a reaches the radial tick mark 645d, the bearing temperatures and/or oscillatory loads are within an unsafe range of operation of the aircraft in which, potentially, critical failures could occur. Post flight inspection of the bearings and the selected components is highly recommended following operation in that zone. Table 1 shows the predetermined limits of each of segments 640a-c in accordance with an embodiment of the invention.

maneuver mode are defined in terms of occurrence of damage fraction after a given time period. For example, when the indicating needle 635a reaches the third segment 640c and the aircraft is in a maneuver mode of operation, a stress exerted on the selected component during a 10 hour period will create an expected damage failure. Similarly, when the indicating needle 635 reaches the radial tick mark 645d (i.e., band-edge of the third segment 640c) and the aircraft is in a maneuver mode, a stress exerted on the selected component during a 1 hour period will create an expected damage failure. These time limits may be referred to hereinafter as the 1 hour limit and the 10 hour limit.

It will be appreciated that the position of the radial tick marks 645a-d on the common scale and their corresponding limits in terms of temperature and oscillatory load values are up to the designer and may, therefore, change in other embodiments of the invention.

In one embodiment of the invention, the calculation unit 605 is adapted to calculate or provide estimate oscillatory loads for a plurality of components. Examples of components that may be monitored with the feathering, flapping and rotor loads indicator 600 in connection with a tiltrotor aircraft, such as, for example, the V22 Tiltrotor aircraft manufactured by Bell Helicopter, Inc., include (1) the inboard proprotor blade (tangs), (2) the proprotor blade abrasion strip, (3) the outboard proprotor blade or trailing edge, (4) the blade fold support, (5) the blade fold latch pin, (6) the inboard bearing retainer, (7) the outboard spindle pitch change bearing assem-

TABLE 1

| Radial tick mark Position | Bearing 1 Temperature (Hub Bearing) | Bearing 2 Temperature (CF Bearing) | Oscillatory Load (1 G Flight Mode) | Oscillatory Load (Maneuver Mode) |
|---|---|---|---|---|
| 645a | 150 F. | 150 F. | 70% of endurance limit | 90% of endurance limit |
| 645b | 180 F. | 180 F. | 90% of endurance limit | endurance limit |
| 645c | 200 F. | 200 F. | endurance limit | Damage fraction = 1 in 10 flight hours |
| 645d | 220 F. | 220 F. | Damage fraction = 1 in 10 flight hours | Damage fraction = 1 in 1 flight hour |

The endurance limit of Table 1 represents the highest stress or range of stress that can be repeated indefinitely without failure of the component.

The oscillatory loads differ depending on whether the aircraft is in a 1 G flight mode or maneuver mode. As shown in Table 1, a more conservative criteria is applied to a 1 G level flight than in a maneuver mode. A 1 G flight mode of operation corresponds to a straight level flight, which generally represents the majority of the aircraft's flight time. In this mode of operation, the aircraft is not climbing, or descending. A maneuver mode of operation corresponds to a non straight level flight such as, for example, a turn, a takeoff or a landing. A maneuver mode is much less frequent and shorter in duration than the 1 G flight mode. However; the oscillatory loads exerted on any given components are generally higher in a maneuver mode. In practice, the calculation unit 605 estimates the load exerted for each component for a 1 G flight mode and applies a more conservative criteria depending on whether the aircraft is in a 1 G flight mode or a maneuver mode. For example, when the 645d tick mark is reached, this means that either a 1 G flight mode is at the 10 hour limit or a maneuvering mode is at the 1 hour limit.

As also shown in Table 1, the position of the tick mark 645d for a 1 G flight mode and tick marks 645c and 645d for a bly, (8), the proprotor yoke, (9) the pendulum yoke mast adaptor and (10) the pendulum yoke mast adapter bushings. All of these components are selected, in one embodiment of the invention, for their susceptibility to stress. However, it will be appreciated that additional, fewer or different components may be used in other embodiments of the invention.

In one embodiment of the invention, the various calculation models, which are used to calculate or estimate the oscillatory loads for the selected components, are constructed based on load level surveys. Information provided by the load level surveys are used to construct trends of oscillatory loads as a function of feathering angle. These trends are provided for (a) each of the selected components, (b) the 1 G flight mode of operation and (c) the maneuver mode of operation. In addition, for a tiltrotor aircraft, these trends may also be provided for various nacelle angles (e.g., 30°, 60°, 75° and 90°).

Figure 7:
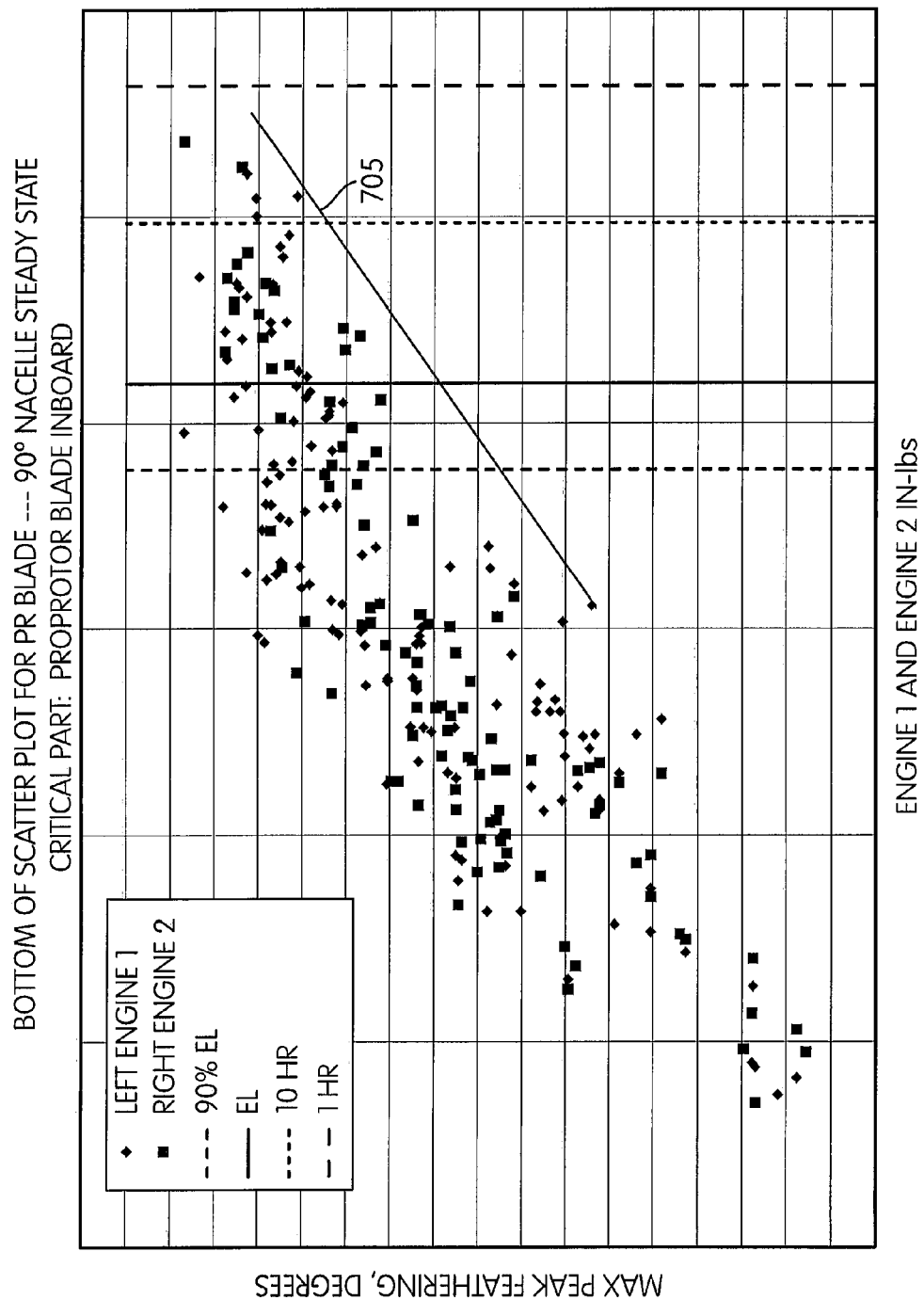
FIG. 7 shows the variations of oscillatory loads as a function of feathering angle for an inboard proprotor blade.

Referring now to FIG. 7, this figure shows the oscillatory load values (in lbs) for the inboard proprotor blade. Oscillatory loads for the inboard proprotor blade were retrieved from load level surveys and plotted against feathering angle. In the embodiment of FIG. 7, the models are constructed for feathering angles included in the range between about 0° and 18°.

Variations of the oscillatory loads in FIG. 7 are provided for (a) two engines (denoted engines 1 and 2 in FIG. 7), (b) a nacelle angle of 90° and (c) a maneuver mode of operation. For a nacelle angle of 90°, the tiltrotor aircraft is in a helicopter mode.

FIG. 7 shows the 90% endurance limit, the endurance limit EL, the 10 hour limit and the one hour limit. Based on these data, a bottom of scatter analysis (curve 705) is used to determine a conservative trend of oscillatory loads as a function of feathering angle for the selected component.

Similar charts and trends are obtained for each of the selected components, the 1 G flight and maneuver modes of operation, and various nacelle angles (for tilt rotor aircrafts). In each of the charts obtained for the 1 G flight mode of operation, the intersections of the bottom of scatter trendlines and the oscillatory loads defining the 90% endurance limit, the endurance limit and the 10 hour limit are used to define breakpoints for the feathering, flapping and rotor loads indicator 600 for each component. Similarly, in each of the charts obtained for a maneuver mode of operation, the intersections of the bottom of scatter trendlines and the oscillatory loads defining the endurance limit, the 10 hour limit and the 1 hour limit are also used to define breakpoints for the feathering, flapping and rotor loads indicator for each component. These breakpoints correspond to the positions of the radial tick marks 645a-d in FIG. 6.

Figure 8:
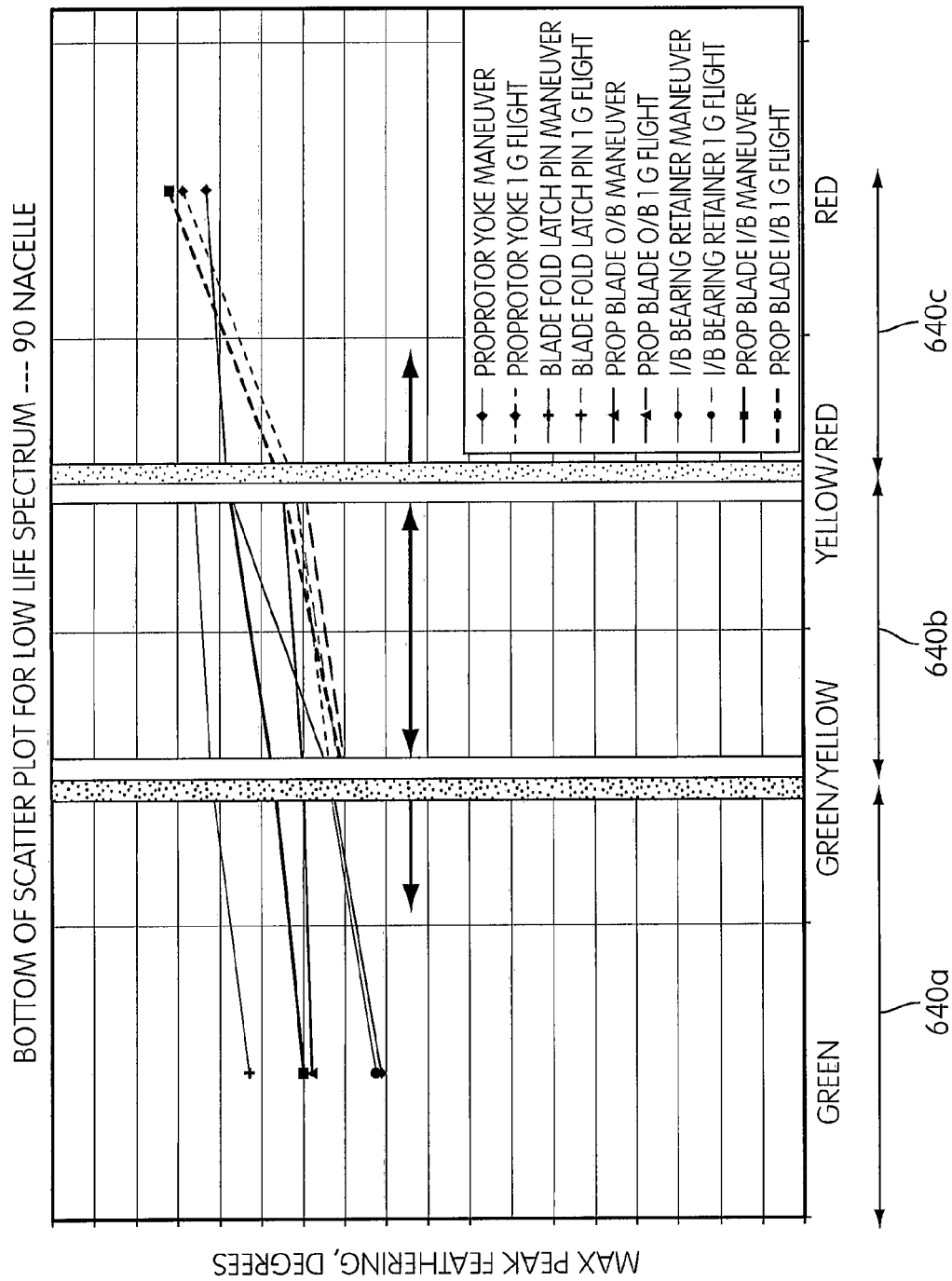
FIG. 8 shows graphs representing the oscillatory load trends as a function of feathering angle for five different components and for a 1 G flight mode of operation and a maneuver mode of operation.

For example, referring to FIG. 8, this figure shows summary data representing the oscillatory load trends as a function of feathering angle for five different components and for a 1 G flight mode of operation and a maneuver mode of operation. The trends are given for a 90° nacelle angle. The five components of FIG. 8 are inboard proprotor blade, outboard proprotor blade, blade fold latch pin, inboard bearing retainer and proprotor yoke. All the scatter plots obtained for the selected components, the different flying modes of operation (1 G mode and maneuver mode) and the various nacelle angles are used by the calculation unit 605 to determine oscillatory loads exerted on the various components for various feathering angles. As will be explained in more detail hereinafter, the calculation unit 605 is configured to compare the oscillatory loads retrieved for each component. For reference, FIG. 8 shows the corresponding segments 640a-c of the gauge/indicator 630.

In one embodiment of the invention, the models that calculate or provide an estimated temperature of the hub bearing and the feathering bearing are constructed in a similar manner as those that calculate the oscillatory loads. The calculation models that calculate the temperature of the hub bearing and the feathering bearing are both empirical models that are constructed based on temperature surveys. In an embodiment, these calculation models calculate or provide an estimated temperature based on outside air temperature and flapping angle or feathering angle.

In one embodiment of the invention, the calculation model that calculates the temperature $T_f$ of the feathering bearing as a function of time t is a first order linear model defined as:

$$T_f = \left(\frac{T_{steadystate}}{\tau t + 1}\right) + To \quad (a)$$

where $T_{steadystate}$ represents the steady state temperature change, $T_O$ represents the initial outside air temperature and $\tau$ is a time constant function of feathering angle.

Figure 9:
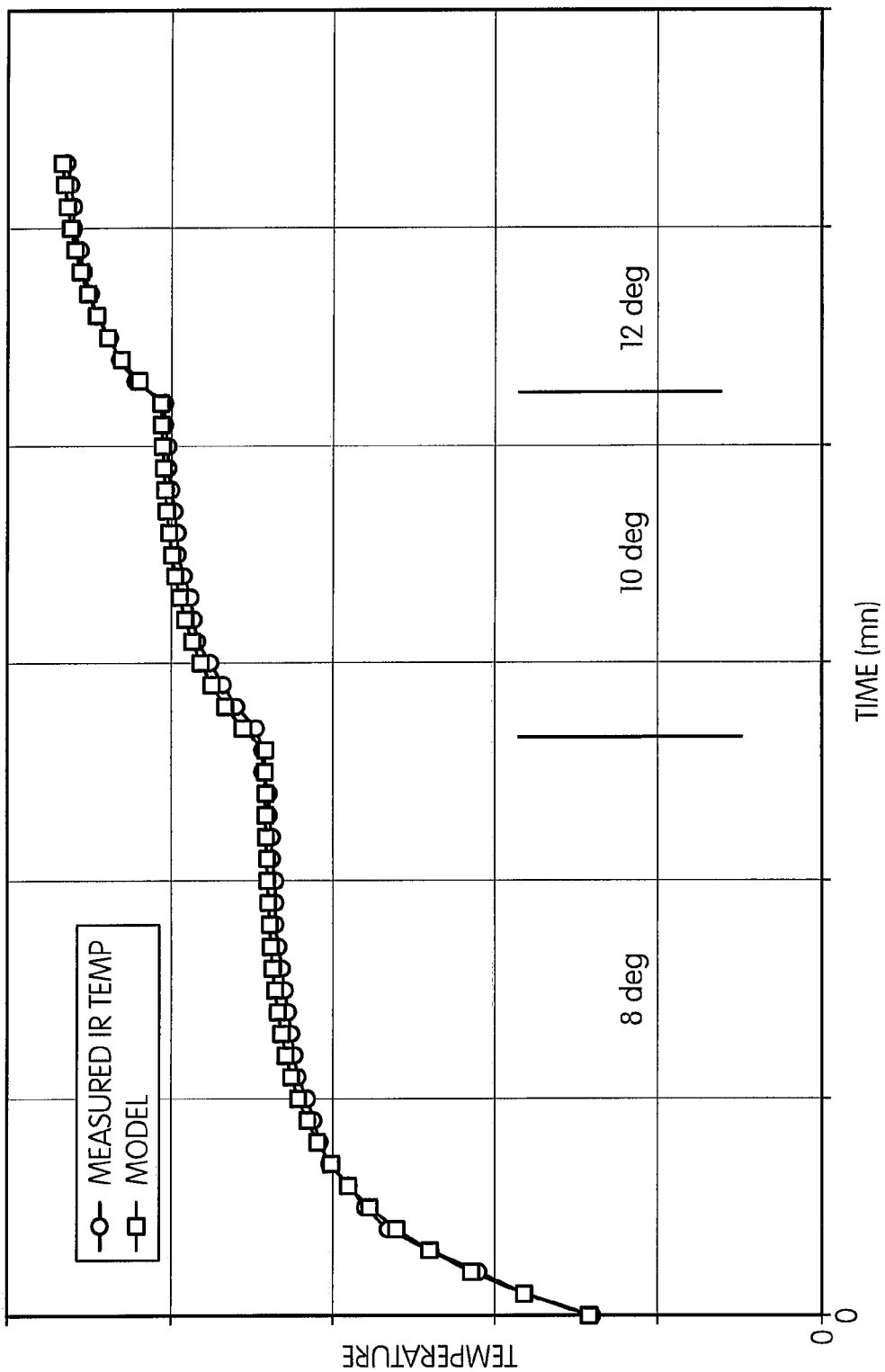
FIG. 9 shows the variation of bearing temperature as a function of time for three feathering angles (8°, 10° and 12°) in accordance with an embodiment of the invention.

The first order linear model is determined based on temperature surveys. Specifically, variations of the bearing temperature as a function of time for a given feathering angle are used to extract the value of the steady state temperature $T_{steadystate}$ and the time constant $\tau$. FIG. 9 shows the variation of the bearing temperature as a function of time for three feathering angles: 8°, 10° and 12°. FIG. 9 shows the measured temperatures and the temperatures provided by the calculation model. The outside air temperature $T_O$, which corresponds to the temperature at t=0, is about 70 F. Based on these experimental data obtained by infrared measurements, the steady state temperature and the time constant are derived. For an 8° feathering angle, the steady state temperature increase is about 100 F. The time constant is about 63% of the steady state delta temperature. As shown in FIG. 9, the first order linear model matches the experimental data.

Figure 10:
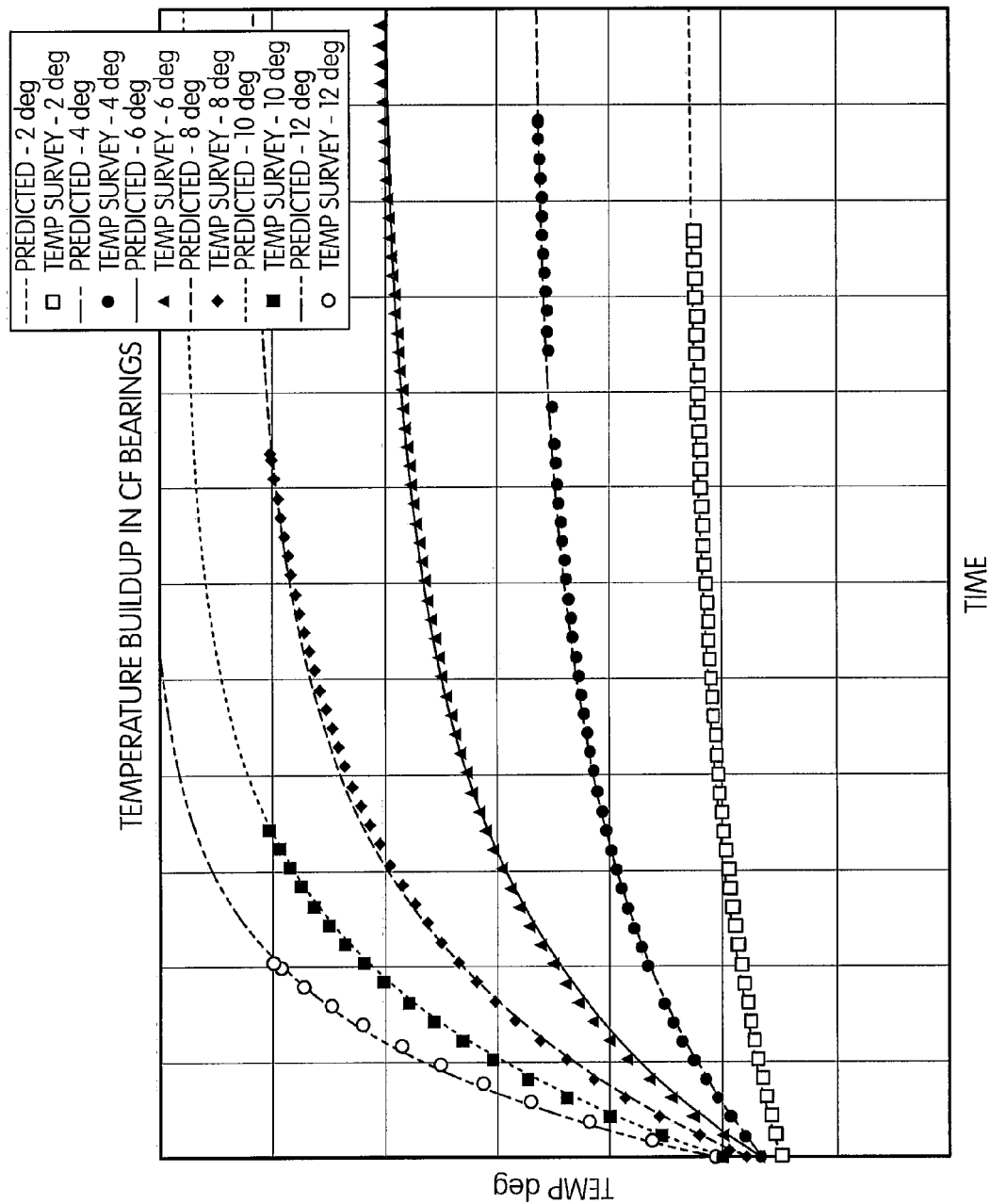
FIG. 10 shows the variation of bearing temperature as a function of time for six feathering angles (2°, 4°, 6°, 8°, 10° and 12°) in accordance with an embodiment of the invention.

Similar calculations are made for each feathering angle in order to retrieve the steady state temperatures and the time constants. FIG. 10 shows the predicted temperature buildup in the feathering bearing as a function of time for six different feathering angles (2°, 4°, 6°, 8°, 10° and 12°). FIG. 10 also shows the measured temperature in the bearing for each feathering angle. As can be seen, the bearing temperatures predicted by the first order linear models match the measured temperatures.

In one embodiment of the invention, the calculation model that calculates or provides an estimated buildup temperature in the hub bearing is also a first order linear model. However, the estimated buildup temperature of the hub bearing is calculated based on the flapping angle and outside air temperature. The flapping angle is generally measured with transducers that are adapted to measure the deflection of the blades. Similarly to the feathering angle and outside air temperature, the flapping angle is one of the control system parameters that is monitored during operation of the aircraft.

The hub bearing calculation model is adapted to accurately replicate test data of hub bearing temperature as a function of time. In one implementation, the hub bearing calculation model uses two variables, which are both functions of the flapping angle. The two variables are (1) stabilized hub spring temperature or steady state temperature above ambient and (2) time constant $\tau'$. The time constant $\tau'$ is defined as the time that is necessary to reach 0.632 of the stabilized delta temperature. These two variables are used in the first order linear model to estimate the buildup temperature $T_h$ in the hub bearing. In one implementation, the first order linear model is defined as follows $$T_f = \left(\frac{T'_{steadystate}}{\tau' t + 1}\right) + To \quad (b)$$

where $T'_{steadystate}$ represents the steady state delta temperature of the hub bearing, $T_O$ represents the initial outside air temperature and $\tau'$ is a time constant function of feathering angle.

Figure 11A:
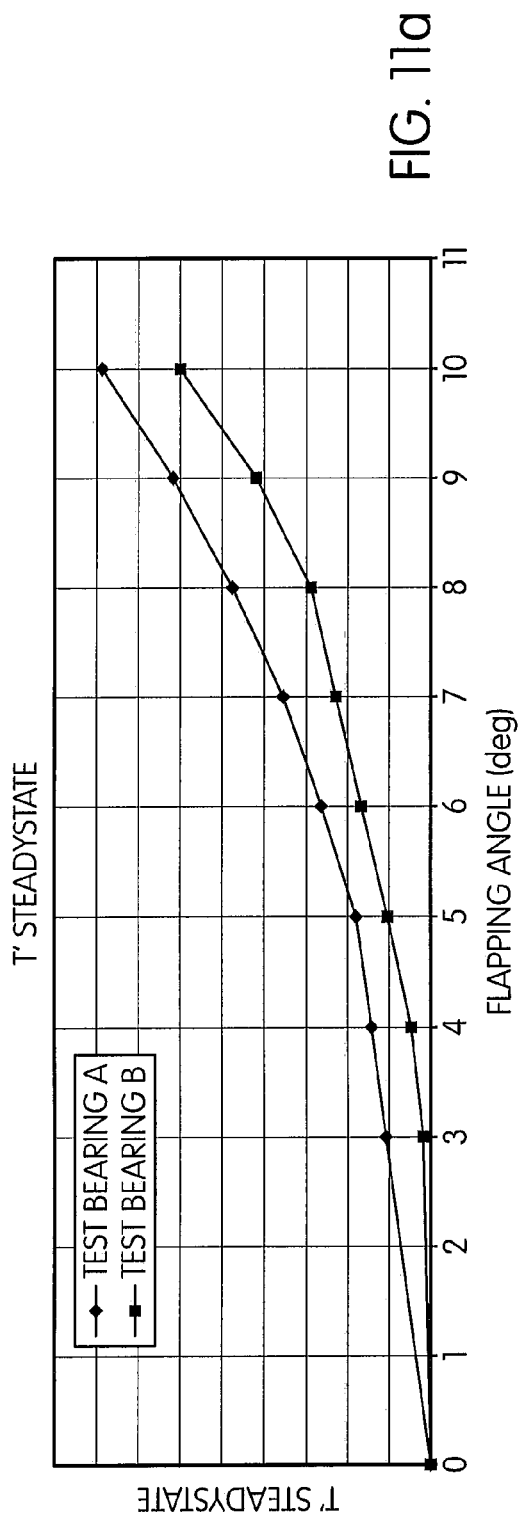
FIGS. 11a-b show, respectively, the variations of the steady state temperature of the hub bearing $T_{steadystate}$ (FIG. 11a) and the time constant τ' (FIG. 11b) as a function of flapping angle in accordance with an embodiment of the invention.
Figure 11B:
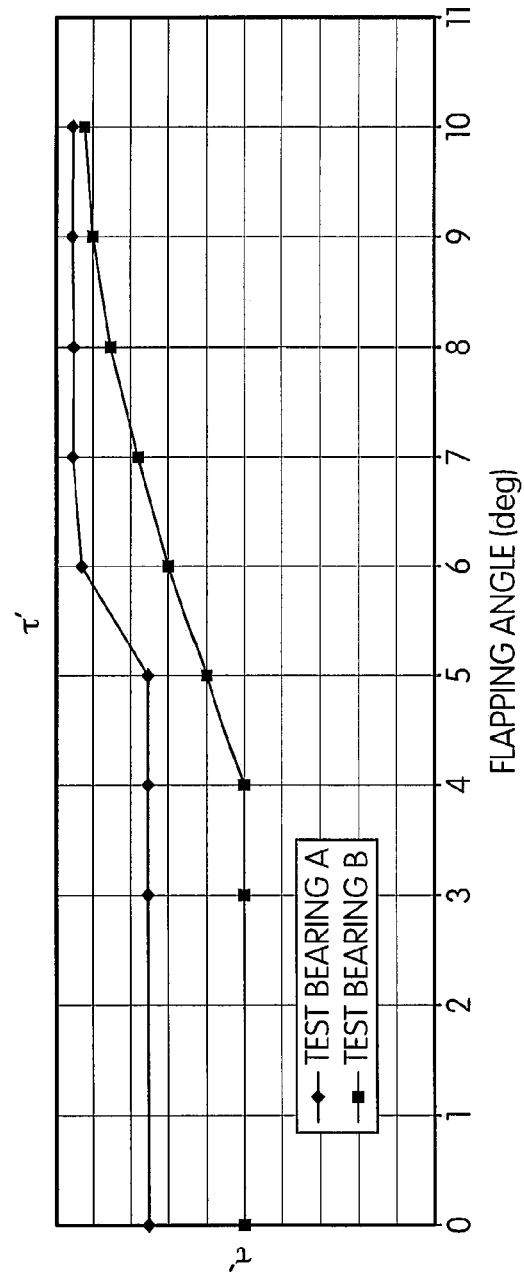
Figure 12:
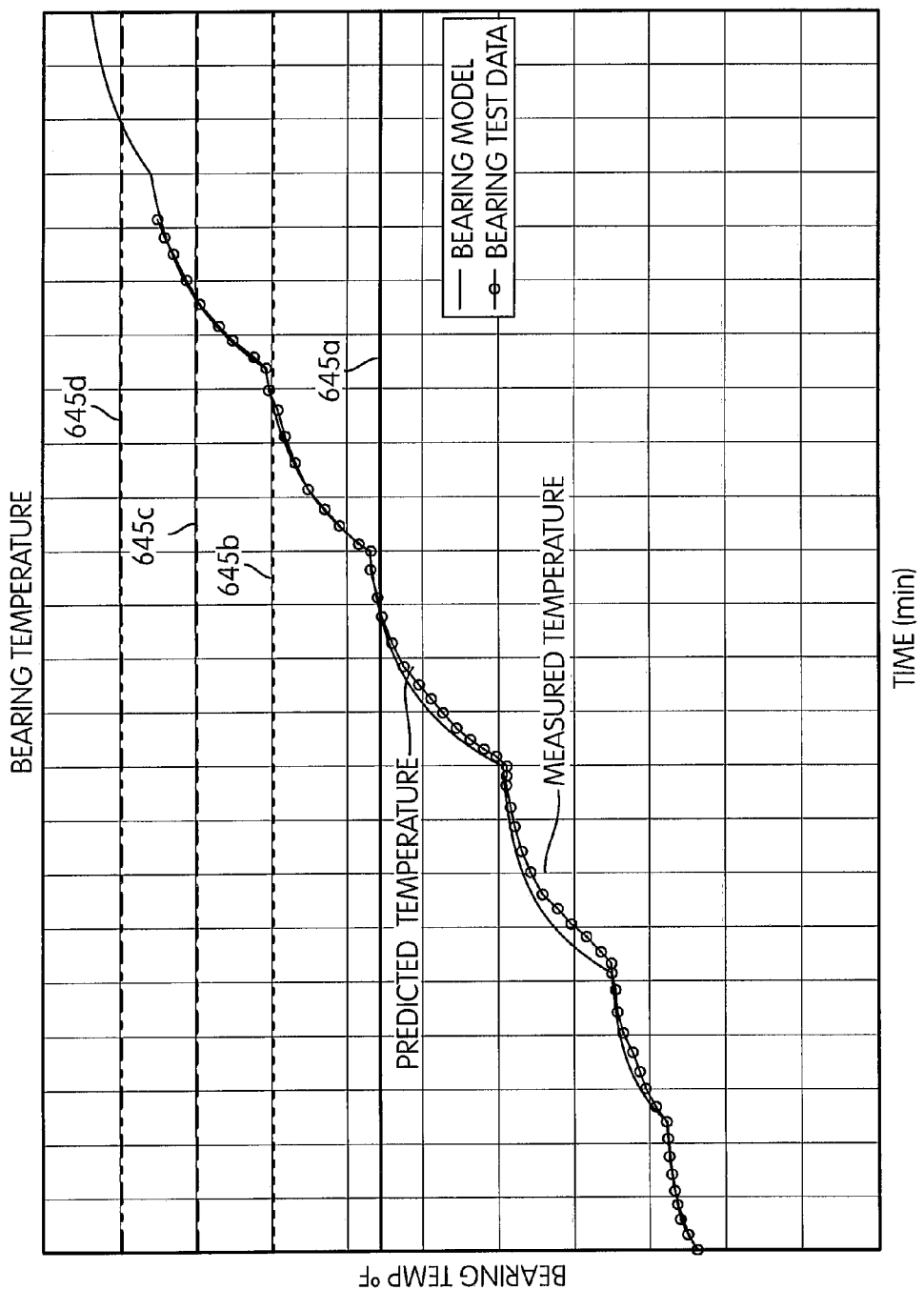
FIG. 12 represents the variation of bearing temperature as a function of time for various flapping angles in accordance with an embodiment of the invention.

Referring to FIGS. 11a-b, these figures show the variations of the steady state temperature of the hub bearing $T'_{steadystate}$ (FIG. 11a) and the time constant $\tau'$ (FIG. 11b) as a function of flapping angle, in accordance with an embodiment of the invention. Data of FIGS. 11a-b were retrieved from lab data. As can be seen in FIG. 12, which represents the variation of bearing temperature as a function of time for various flapping angles, the first order linear calculation model of the hub bearing temperature matches the measured temperatures. For reference, FIG. 12 shows the temperature limits of the segments 640a-c shown in FIG. 6 in accordance with an embodiment of the invention. The first temperature limit, 150 F, the second temperature limit, 180 F, the third temperature limit, 200 F, and the fourth temperature limit, 220 F, correspond, respectively, to radial tick marks 645a, 645b, 645c and 645d in the gauge/indicator 630.

The calculation unit 605 is adapted to provide pilots with current and projected temperatures of critical elastomeric bearings in the rotor and a direct feedback regarding the oscillatory loads severity of the current flight condition. In operation, the calculation unit 605 is adapted to continuously calculate the estimated oscillatory load of the critical component based on the current feathering angle, the temperature buildup in the feathering bearing based on the duration at the current feathering angle and outside temperature, and the temperature buildup in the hub bearing based on the duration at the current flapping angle and the outside air temperature. These calculations may be performed with the calculation models shown in FIGS. 7-12. The calculation unit 605 then continuously compares the data provided by each of the calculation models. In one configuration, the calculation unit 605 is configured to convert oscillatory load data into equivalent temperatures in order to compare these data with the bearing temperatures. This may be done by multiplying the oscillatory loads by a conversion factor. Alternatively, the calculation unit 605 may be configured to normalize each of these calculated data against the gauge/indicator 630.

Figure 13:
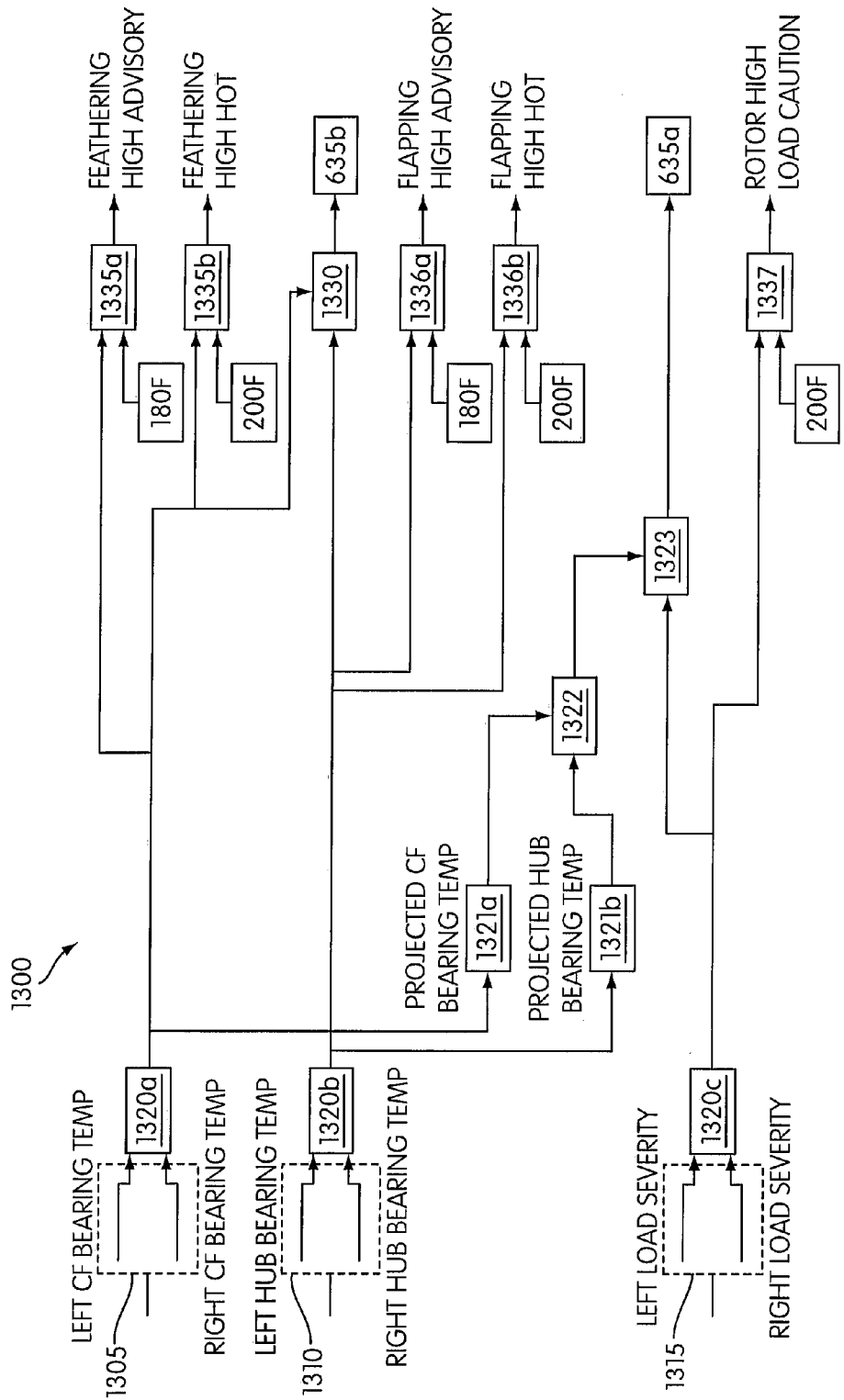
FIG. 13 shows the architecture of the feathering, flapping and rotor loads indicator in accordance with an embodiment of the invention.

FIG. 13 shows the architecture of the feathering, flapping and rotor loads indicator 1300 in accordance with an embodiment of the invention. The feathering, flapping and rotor loads indicator 1300 is configured to provide information as to the bearing temperatures and oscillatory load severity in a tiltrotor aircraft that includes two rotor hubs (right and left rotor hub). It will be appreciated that a similar architecture can be used for a tiltrotor aircraft or other rotorcraft including additional or fewer rotor hubs. The feathering, flapping and rotor loads indicator 1300 includes a first block 1305 that calculates the estimated buildup temperatures in the feathering bearing of the right and left rotor hubs (right CF temp and left CF temp). First block 1305 calculates the estimated current temperature of the feathering bearing with the first first order linear calculation model (a). The feathering, flapping and rotor loads indicator 1300 includes a second block 1310 that calculates the estimated buildup temperatures in the hub bearing of the right and left rotor hubs (right hub temp and left hub temp). Second block 1310 calculates the estimated current temperature of the hub bearing with the second first order linear calculation model (b). The feathering, flapping and rotor loads indicator 1300 also includes a third block 1315 that calculates the estimated oscillatory loads in the plurality of selected components of the right and left rotor hubs. The calculated oscillatory loads of the right and left sides are converted into an equivalent temperature by the third block 1315. The third block 1315 then compares the estimated oscillatory loads in the right and left side and determines the most critical one in each side (right load severity and left load severity). Third block 1315 is also adapted to convert the left and right load severity of the most critical component into an equivalent temperature.

As can be seen in FIG. 13, the feathering, flapping and rotor loads indicator 1300 includes first, second and third comparators 1320a-c that determine the highest values between the right and left rotor hubs of, respectively, the feathering bearing temperature, the hub bearing temperature and the oscillatory load severity. The output of first comparator 1320a is inputted to block or predictor 1321a that is configured to provide a projected CF bearing temperature. The projected CF bearing temperature is calculated using the first first order linear calculation model (a) and corresponds to $T_{steadystate}$.

The projected temperature is indicative of a future temperature of the bearing if the flight conditions of the rotorcraft are maintained. Similarly, the output of second comparator 1320b is inputted to block or predictor 1321b that is configured to provide a projected hub bearing temperature. The projected hub bearing temperature is calculated using the second first order linear calculation model (b) and corresponds to $T_{steadystate}$. The outputs of blocks 1321a and 1321b are then compared with comparator 1322, which outputs the highest value between the projected CF bearing temperature and the projected hub bearing temperature. The highest value between the two projected bearing temperatures is compared with the output of comparator 1320c, i.e. the load severity value (in terms of equivalent temperature) of the most critical component, using comparator 1323. Specifically, comparator 1323 determines the highest value between the projected bearing temperature (i.e. hub or CF bearing) and the load severity value (in terms of equivalent temperature) of the most critical component. The output of comparator 1323 drives the inner pointer 635a of indicator 635.

The output of first comparator 1320a, i.e. the estimated current temperature of the CF bearing, and the output of the second comparator 1320b, i.e. the estimated current temperature of the hub bearing, are inputted to comparator 1330, which determines the highest value between these two bearing temperatures. This highest value is used to drive the outer pointer 635b.

In the embodiment of FIG. 13 the feathering, flapping and rotor loads indicator 1300 is also configured to display advisory and caution alerts. In FIG. 13, the output of comparator 1320a is compared to both the second limit 645b and the third limit 645c of the gauge/indicator 630 to provide a feathering high advisory or a feathering high caution. Comparisons are performed with comparators 1335a-b. In the embodiment of FIG. 13, the second limit 645b is 180 F and the third limit 645c is 200F. Further, the output of comparator 1320b is compared to both the second limit 645b and the third limit 645c of the gauge/indicator 630 to provide a flapping high advisory or a flapping high caution. Comparisons are performed with comparators 1336a-b. In the embodiment of FIG. 13, the second limit 645b is 180 F and the third limit 645c is 200F. Similarly, the output of comparator 1320c is compared to the third limit 645c (equivalent temperature of 200 F) using comparator 1337 to provide the rotor load high caution.

It will be appreciated that the first, second and third blocks may be adapted to normalize the values of the CF bearing temperature, the hub bearing temperature and the load severity for each engine (left and right).

Referring back to FIG. 6, the first indicator or inner pointer 635a provides the highest value among the oscillatory load of the most critical component, the projected temperature of the CF bearing (highest value between left and right engines) and the projected temperature of the hub bearing (highest value between left and right engines). The second indicator or outer pointer 635b is driven by the highest value of the predicted current temperature between the feathering bearing and the hub bearing of the left and right engines.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention.

Specifically, as will be appreciated by one of ordinary skill in the art, the feathering, flapping and rotor loads indicator may be configured to provide an estimated temperature of fewer, additional or different bearings. Similarly, the feathering, flapping and rotor loads indicator may be configured to provide estimated oscillatory loads of fewer, additional or different selected components. In an embodiment, these different components may not be part of the rotor assembly. It will be appreciated that the temperature limits, and more generally the limits, of each segment 640a-c of the gauge/ indicator 630 may be different in other embodiments of the invention. Further, it will be appreciated that the feathering, flapping and rotor loads indicator may be used in any rotorcraft. In addition, it will be appreciated that the principles described herein are also applicable to provide an estimate of the load(s) and bearing temperature(s) in any type of airplane, vehicle, device, apparatus or assembly.

It will be appreciated that the different acts involved in providing critical component status information may be executed in accordance with machine executable instructions. These machine executable instructions may be embedded in a data storage medium of the feathering, flapping and rotor loads indicator. In one implementation, the machine executable instructions may be embedded in a computer product. In an embodiment, there is provided a computer program comprising a program code that, when executed on a computer system, instructs the computer system to perform any or all of the methods described herein.

What is claimed is:

1. A feathering, flapping and rotor loads indicator for use in a rotorcraft, the rotorcraft including at least one engine to power a rotor assembly including a mast and a plurality of blades attached thereto, the indicator comprising:
    a calculation unit configured to calculate (a) a temperature of a bearing of the rotor assembly using a first calculation model, and (b) a load exerted on a selected component of the rotor assembly using a second calculation model, the first and second calculation models adapted to calculate, respectively, the temperature of the bearing and the load exerted on the selected component based on flight control parameters; and
    a display unit configured to dynamically display on a common scale a movable indicator, the movable indicator being driven by the highest value between the temperature of the bearing and the load exerted on the selected component.

2. The indicator of claim 1, wherein the first calculation model is a first order linear model.

3. The indicator of claim 1, wherein the temperature is a projected temperature indicative of a future temperature of the bearing if the flight conditions of the rotorcraft are maintained.

4. The indicator of claim 3, wherein the calculation unit is configured to calculate a current temperature of the bearing using the first calculation model.

5. The indicator of claim 1, wherein the second calculation model is adapted to calculate the load exerted on the selected component of the rotor assembly based on feathering angle of the blades.

6. The indicator of claim 1, wherein the first calculation model is adapted to calculate the temperature of the bearing based on feathering angle of the blades and outside air temperature.

7. The indicator of claim 1, wherein the first calculation model is adapted to calculate the temperature of the bearing based on flapping angle of the blades and outside air temperature.

8. The indicator of claim 1, wherein
    1) the calculation unit is further configured to calculate a temperature of an additional bearing using a third calculation model, the third calculation model adapted to calculate the temperature of the additional bearing based on flight control parameters; and
    2) the movable indicator is driven by the highest value among the temperature of the bearing, the temperature of the additional bearing and the load exerted on the selected component.

9. The indicator of claim 8, wherein the third calculation model is a first order linear model.

10. The indicator of claim 8, wherein the temperature of the bearing and the temperature of the additional bearing are projected temperatures indicative of, respectively, a future temperature of the bearing and a future temperature of the additional bearing if the flight conditions of the rotorcraft are maintained.

11. The indicator of claim 10, wherein the calculation unit is configured to calculate a current temperature of the bearing using the first calculation model and a current temperature of the additional bearing using the third calculation model.

12. The indicator of claim 11, wherein the display unit is configured to dynamically display on the common scale an additional movable indicator, the additional movable indicator being driven by the highest value between the current temperature of the bearing and the current temperature of the additional bearing.

13. The indicator of claim 8, wherein the first calculation model is adapted to calculate the temperature of the bearing based on feathering angle of the blades and outside air temperature and wherein the third calculation model is adapted to calculate the temperature of the additional bearing based on flapping angle of the blades and outside air temperature.

14. The indicator of claim 8, wherein the bearing is a CF bearing and the additional bearing is a hub bearing that is adapted to transmit forces from a rotor of the rotor assembly to the mast.

15. The indicator of claim 1, wherein the calculation unit is configured to calculate loads exerted on a plurality of selected components of the rotor assembly using a plurality of calculation models, each of the plurality of calculation models adapted to calculate one of the loads exerted on a corresponding selected component of the plurality of selected components based on flight control parameters.

16. The indicator of claim 1, wherein the second model is adapted to calculate the load exerted on the selected component when the rotorcraft operates in a one G flight condition or a maneuver condition.

17. The indicator of claim 1, wherein the flight control parameters include flapping angle, feathering angle, nacelle angle and outside air temperature.

18. The indicator of claim 1, wherein the calculation unit is configured to convert the load exerted on the selected component into an equivalent temperature.

19. The indicator of claim 1, wherein the calculation unit is configured to normalize the value of the temperature of the bearing and the value of the load exerted on the selected component.

20. A method of providing component status information in a rotorcraft, the rotorcraft including at least one engine to power a rotor assembly including a mast and a plurality of blades attached thereto, the method comprising:
    calculating (a) a temperature of a bearing of the rotor assembly using a first calculation model and (b) a load exerted on a selected component of the rotor assembly using a second calculation model, the first and second calculation models adapted to calculate, respectively, the temperature of the bearing and the load exerted on the selected component based on flight control parameters; and dynamically displaying on a common scale a movable indicator, the movable indicator being driven by the highest values between the temperature of the bearing and the load exerted on the selected component.

21. The method of claim 20, wherein the first calculation model is a first order linear model.

22. The method of claim 20, wherein the temperature is a projected temperature indicative of a future temperature of the bearing if the flight conditions of the rotorcraft are maintained.

23. The method of claim 22, further comprising calculating a current temperature of the bearing using the first calculation model, 24. The method of claim 20, wherein the second calculation model is adapted to calculate the load exerted on the selected component of the rotor assembly based on feathering angle of the blades.

25. The method of claim 20, wherein the first calculation model is adapted to calculate the temperature of the bearing based on feathering angle of the blades and outside air temperature.

26. The method of claim 20, wherein the first calculation model is adapted to calculate the temperature of the bearing based on flapping angle of the blades and outside air temperature.

27. The method of claim 20, further comprising calculating a temperature of an additional bearing using a third calculation model, the third calculation model adapted to calculate the temperature of the additional bearing based on flight control parameters, wherein the movable indicator is driven by the highest value among the temperature of the bearing, the temperature of the additional bearing and the load exerted on the selected component.

28. The method of claim 27, wherein the third calculation model is a first order linear model.

29. The method of claim 27, wherein the temperature of the bearing and the temperature of the additional bearing are projected temperatures indicative of, respectively, a future temperature of the bearing and a future temperature of the additional bearing if the flight conditions of the rotorcraft are maintained.

30. The method of claim 29, further comprising calculating a current temperature of the bearing using the first calculation model and calculating a current temperature of the additional bearing using the third calculation model.

31. The method of claim 29, further comprising dynamically displaying on the common scale an additional movable indicator, the additional movable indicator being driven by the highest value between the current temperature of the bearing and the current temperature of the additional bearing.

32. The method of claim 20, wherein the flight control parameters include flapping angle, feathering angle, nacelle angle and outside air temperature.

33. The method of claim 20, further comprising converting the load exerted on the selected component into an equivalent temperature.

34. The method of claim 20, further comprising normalizing the value of the temperature of the bearing and the value of the load exerted on the selected component.

35. A non-transitory machine readable medium encoded with machine executable instructions for providing component status information in a rotorcraft, including at least one engine to power a rotor assembly including a nacelle, a mast and a plurality of blades attached thereto, in accordance with a method comprising:

calculating (a) a temperature of a bearing of the rotor assembly using a first calculation model and (b) a load exerted on a selected component of the rotor assembly using a second calculation model, the first and second calculation models adapted to calculate, respectively, the temperature of the bearing and the load exerted on the selected component based on flight control parameters; and dynamically displaying on a common scale a movable indicator, the movable indicator being driven by one of the current temperature of the bearing or the load exerted on the selected component having the highest value.

36. A feathering, flapping and rotor loads indicator for use in a rotorcraft, the rotorcraft including at least one engine to power a rotor assembly including a mast and a plurality of blades attached thereto, the indicator comprising:

a calculation unit configured to calculate (a) a current temperature of a bearing of the rotor assembly using a first calculation model, (b) a projected temperature of the bearing using the first calculation model and (c) a load exerted on a selected component of the rotor assembly using a second calculation model, the first and second calculation models adapted to calculate, respectively, the projected and the current temperatures of the bearing and the load exerted on the selected component based on flight control parameters; and a display unit configured to dynamically display on a common scale a movable indicator, the movable indicator being driven by the highest value between the projected temperature of the bearing and the load exerted on the selected component.

37. The indicator of claim 36, further comprising a second movable indicator, the second movable indicator being driven by the current temperature of the bearing.

38. The indicator of claim 36, wherein
1) the calculation unit is further configured to calculate a projected temperature and a current temperature of an additional bearing using a third calculation model, the third calculation model adapted to calculate the projected and the current temperatures of the additional bearing based on flight control parameters; and
2) the movable indicator is driven by the highest value among the projected temperature of the bearing, the projected temperature of the additional bearing and the load exerted on the selected component.

39. The indicator of claim 38, further comprising a second movable indicator, the second movable indicator being driven by the highest value between the current temperature of the bearing and the current temperature of the additional bearing.

40. A method of providing component status information in a rotorcraft, the method comprising:

calculating, with a calculation unit, a temperature of a bearing using a first calculation model stored in a machine readable medium; and calculating, with the calculation unit, a load exerted on a selected component of the rotorcraft using a second calculation model stored in the machine readable medium, the first and second calculation models adapted to calculate, respectively, the temperature of the bearing and the load exerted on the selected component based on flight control parameters.

41. The method of claim 40, wherein the first calculation model is a first order linear model.

42. The method of claim 40, wherein the temperature is a projected temperature indicative of a future temperature of the bearing if the flight conditions of the rotorcraft are maintained.

43. The method of claim 42, further comprising calculating a current temperature of the bearing using the first calculation model.

44. The method of claim 40, wherein the flight control parameters include flapping angle, feathering angle, nacelle angle and outside air temperature.

45. A method of providing component status information in a rotorcraft, the method comprising:
   calculating a temperature of a bearing using a first calculation model;
   calculating a load exerted on a selected component of the rotorcraft using a second calculation model, the first and second calculation models adapted to calculate, respectively, the temperature of the bearing and the load exerted on the selected component based on flight control parameters, and
   displaying the highest value between the temperature of the bearing and the load exerted on the selected component.

46. An indicator configured to provide component status information in a rotorcraft, the indicator comprising a calculator configured to calculate (1) a temperature of a bearing using a first calculation model and (2) a load exerted on a selected component of the rotorcraft using a second calculation model, the first and second calculation models adapted to calculate, respectively, the temperature of the bearing and the load exerted on the selected component based on flight control parameters.

47. The indicator of claim 46 wherein the first calculation model is a first order linear model.

48. The indicator of claim 47, wherein the temperature is a projected temperature indicative of a future temperature of the bearing if the flight conditions of the rotorcraft are maintained.

49. The indicator of claim 48, wherein the calculator is configured to calculate a current temperature of the bearing using the first calculation model.

50. The indicator of claim 46, wherein the flight control parameters include flapping angle, feathering angle, nacelle angle and outside air temperature.

51. The indicator of claim 46, further comprising a display unit configured to display on a common scale a movable indicator, the movable indicator being driven by the highest value between the temperature of the bearing and the load exerted on the selected component.

* * * * *